(12) United States Patent
Stichling

(10) Patent No.: US 12,487,911 B2
(45) Date of Patent: Dec. 2, 2025

(54) COMPUTER-IMPLEMENTED METHOD FOR THE USE OF STORED SPECIFICATION PARTS

(71) Applicant: dSPACE GmbH, Paderborn (DE)

(72) Inventor: Dirk Stichling, Paderborn (DE)

(73) Assignee: dSPACE GMBH, Paderborn (DE)

( * ) Notice: Subject to any disclaimer, the term of this patent is extended or adjusted under 35 U.S.C. 154(b) by 183 days.

(21) Appl. No.: 18/208,969

(22) Filed: Jun. 13, 2023

(65) Prior Publication Data
US 2023/0401145 A1    Dec. 14, 2023

(30) Foreign Application Priority Data
Jun. 14, 2022   (DE) .................... 10 2022 114 913.7

(51) Int. Cl.
*G06F 11/3668*   (2025.01)
*G06F 8/36*   (2018.01)
(Continued)

(52) U.S. Cl.
CPC ............ *G06F 11/3684* (2013.01); *G06F 8/36* (2013.01); *G06F 8/71* (2013.01); *G06F 11/3698* (2025.01)

(58) Field of Classification Search
CPC .......... G06F 8/36; G06F 8/71; G06F 11/3684; G06F 11/3698
See application file for complete search history.

(56) References Cited

U.S. PATENT DOCUMENTS

2012/0265476 A1* 10/2012 Yoshimura .......... G06F 11/3684
                                                                       702/123
2022/0055641 A1*  2/2022 Wolff .................. B60W 60/001

FOREIGN PATENT DOCUMENTS

DE    102017200180 A1    7/2018
DE    112022000970 T5 * 11/2023    ........... G05D 1/0027
(Continued)

OTHER PUBLICATIONS

De Gelder, Erwin, et al., Towards an Ontology for Scenario Definition for the Assessment of Automated Vehicles: An Object-Oriented Framework, IEEE Transactions on Intelligent Vehicles, Jan. 2022, 15 pages, [retrieved on Jun. 16, 2025], Retrieved from the Internet: <URL:http://ieeexplore.ieee.org/>.*

(Continued)

*Primary Examiner* — Geoffrey R St Leger
(74) *Attorney, Agent, or Firm* — Muncy, Geissler, Olds & Lowe, P.C.

(57) ABSTRACT

A computer-implemented method for the use of stored specification parts of at least one test and/or simulation, comprising the steps: providing the at least one test to be specified and/or the one simulation for testing driving functions of a vehicle and the at least one test and/or the at least one simulation are determined by at least one parameter value and/or setting value; and performing a specification of the at least one test and/or the at least one simulation, wherein the specification comprises at least one specification part, wherein the parameter values and/or the setting values are selected and concrete parameter values and/or setting values are assigned by the specification for the test and/or the simulation, wherein the parameter values and/or setting values are selected manually or automatically, and wherein already stored specification parts are selected manually and/or automatically and integrated into the specification.

18 Claims, 4 Drawing Sheets

(51) Int. Cl.
*G06F 8/71* (2018.01)
*G06F 11/3698* (2025.01)

(56) References Cited

FOREIGN PATENT DOCUMENTS

| | | | | |
|---|---|---|---|---|
| EP | 3438901 A1 | * | 2/2019 | ......... G06F 16/2379 |
| WO | WO-2023232892 A1 | * | 12/2023 | .......... G06F 11/3684 |

OTHER PUBLICATIONS

Juhnke, Katharina et al: "Challenges Concerning Test Case Specifications in Automotive Software Testing" 44th Euromicro Conference on Software Engineering and Advanced Applications, 2018, pp. 33-40.
Rocha de Souza, Eric et al: "A Method for aplying reuse in tests specifications" Eighth International Conference on the Quality of Information and Communications Technology, 2012, pp. 143-148.
SAE J3016; "Operating conditions under which a given driving automation system, or feature thereof, is specifically designed to function, including, but not limited to, environmental, geographical, and time-of-day restrictions, and/or requisite presence or absence of certain traffic or roadway characteristics."; On-Road Automated Driving (Orad) Committee Jul. 15, 2021.

* cited by examiner

COMPUTER-IMPLEMENTED METHOD FOR THE USE OF STORED SPECIFICATION PARTS

This nonprovisional application claims priority under 35 U.S.C. § 119(a) to German Patent Application No. 10 2022 114 913.7, which was filed in Germany on Jun. 14, 2022, and which is herein incorporated by reference.

BACKGROUND OF THE INVENTION

Field of the Invention

The invention relates to a computer-implemented method for the use of stored specification parts. The present invention further relates to a test unit for the use of stored specification parts. The present invention moreover relates to a computer program and to a computer-readable data storage medium.

Description of the Background Art

Driving assistance systems such as, e.g., adaptive cruise control and/or functions for highly automated or autonomous driving can be verified or validated using various verification methods. In this regard, in particular, hardware-in-the-loop methods, software-in-the-loop methods, simulations, and/or test drives can be used.

The effort, in particular the time and/or cost, for testing such vehicle functions using the above-mentioned verification methods is typically very high, because a large number of potentially possible driving situations must be tested. A specific test case and/or test suites must be specified if applicable for each of these driving situations. Test suites here represent a combination of a number of related test cases.

Testing an at least partially autonomous transport vehicle exclusively on the road with travel distances of over billions of kilometers is not possible for reasons of time and cost. In addition, many redundant test kilometers would arise, whereas critical and unusual situations that are relevant to the capabilities of the at least partially autonomous vehicle, however, would not occur. For this purpose, precise specifications must be generated for these scenarios and the test cases they contain.

This can lead to a high effort for test drives as well as for simulations. DE 10 2017 200 180 A1 provides a method for verifying and/or validating a vehicle function intended for autonomously guiding a vehicle in the longitudinal and/or lateral direction.

The method in DE 10 2017 200 180 includes a step for determining, on the basis of environmental data relating to an environment of the vehicle, a test control instruction of the vehicle function to an actuator of the vehicle, wherein the test control instruction is not implemented by the actuator. The method further includes simulating, on the basis of environment data and using a road user model regarding at least one road user in the environment of the vehicle, a fictitious traffic situation that would exist if the test control instruction had been implemented. The method also provides test data related to the fictitious traffic situation. The vehicle function is operated passively here in the vehicle to determine the test control instruction.

A disadvantage of this method is that an actual operation of the vehicle is required for the verification and/or validation of the vehicle function in order to determine the required data.

An autonomous vehicle contains a large number of control units. Each individual control unit and its interconnection must be extensively tested during development, function release, and homologation. Scenario-based testing can be used to ensure the faultless functioning of the control units in any traffic situation. In scenario-based testing, the vehicle's driving style is analyzed in a traffic situation that is as close to reality as possible. The traffic situation aspects to be analyzed and their evaluation depend on the system to be tested. To this end, scenarios that can be described as an abstraction of a traffic situation are defined in the scenario-based testing of systems and system components for the autonomous guidance of a motor vehicle. A logical scenario here is the abstraction of a traffic situation with the road, the driving behavior, and the surrounding traffic without specifying concrete parameter values. By choosing concrete parameter values, the logical scenario becomes a concrete scenario. Such a concrete scenario corresponds to a single traffic situation in each case. Test cases can then again be executed for each scenario. A combination of test cases corresponds to a test suite.

A deviating specification is required to vary the test cases, test suites, and/or scenarios.

For this purpose, parameter combinations can be selected independently by algorithms or manually by a test engineer. Therefore, in order to optimally support the specification, a computer-implemented method for the use of stored specification parts is provided according to the invention, in order to be able to achieve a test process that is as resource-saving and time-reduced as possible.

SUMMARY OF THE INVENTION

It is therefore an object of the invention to provide a method and a device that advances the prior art. To this end, structures must be created to store, manage, and logically retrieve specification parts so that they can be incorporated into further specifications.

In accordance with an exemplary embodiment of the invention, a computer-implemented method is proposed for the use of stored specification parts of at least one test and/or simulation, comprising the following steps: providing the at least one test to be specified and/or the one simulation for testing driving functions of a vehicle and the at least one test and/or the at least one simulation are determined by at least one parameter value and/or setting value; and performing a specification of the at least one test and/or the at least one simulation, wherein the specification includes specification parts, wherein the parameter values and/or the setting values are selected and concrete parameter values and/or setting values are assigned by the specification for the test and/or the simulation, wherein the parameter values and/or setting values are selected manually or automatically, and wherein already stored specification parts are selected manually and/or automatically and integrated into the specification.

For the basic inventive differentiation of traffic scenarios or scenarios in scenario-based testing, not only static parameters, such as, e.g., but not limited to surroundings, buildings, or roadway width, are used, but also in particular the driving behavior of the individual road users. The movements of the road users and thus the driving behavior are described by trajectories. Trajectories describe a path in both spatial and temporal directions. Movements of road users can be differentiated by parameters such as, e.g., speed.

An autonomous driving function can be realized by a system, for example, a control unit. The control unit can be conventionally tested in the real vehicle in real traffic situations and validated by hardware-in-the-loop tests or alternatively by fully virtual tests.

A simulation can also be used for this purpose. In addition to scenario-based testing, other virtual testing methods can also be used, for example, step-based testing, replay testing, or requirement-based testing. Scenario-based testing is carried out here merely as an example.

Using the present method, for example, a so-called cut-in scenario can be differentiated from other scenarios. The cut-in scenario can be described as a traffic situation in which a highly automated or autonomous vehicle is driving in a predetermined lane and another vehicle with a reduced speed compared to an ego vehicle cuts from another lane into the lane of the ego vehicle at a certain distance. The ego vehicle here refers to the vehicle under test (SUT).

In general the term "ego vehicle" can represent a virtual vehicle in the center of a simulation or a test. E.g. the vehicle for that a new function is to be developed or tested. Typically, one skilled in the art uses such to distinguish a central vehicle ("ego") from other vehicles or traffic participants (pedestrians, bicycles, etc.) that are usually called "fellows" or "fellow vehicles" that appear in a simulation or test and can interact or have an impact on the ego. For example, there may be several vehicles in a scenario in order to test a function of the ego vehicle but these fellow vehicles may not have the function to be tested, e.g. automatic braking systems.

The speeds of the ego vehicle and the other vehicle, which is also called the fellow vehicle, are constant in this case. Because the speed of the ego vehicle is higher than that of the fellow vehicle, the ego vehicle must be slowed down to avoid a collision of the two vehicles.

But a cut-in scenario can also take various forms, such as, e.g., a difference in the speed of the road users.

Furthermore, a scenario such as a passing-by scenario is possible in that the ego vehicle represents the overtaking vehicle, so that the ego vehicle travels in a predetermined lane and overtakes another vehicle with a reduced speed compared to the ego vehicle. In this case, the ego vehicle changes/swerves to another lane and passes the fellow vehicle at a higher speed. The speed of the ego vehicle does not have to be constant in this scenario. After the ego vehicle has passed the fellow vehicle, the ego vehicle swerves back into the previous lane.

Such scenarios can be simulated with different parameter values. In order to use simulation and computing time in the most resource-saving way, a test follow-up control is required to achieve high coverage—homologation. Likewise, a reuse of specifications and/or specification parts that have already been developed is necessary for this purpose.

For this purpose, deviating types of parameters that usually have to be specified in advance are listed: scenery parameters comprising at least one of the features: a number of and/or a width of a lane and/or curves and/or road restrictions and/or an ambient temperature; and driving situation parameters describing the number and properties of moving objects in the scenario, comprising at least one of the features: a number of road users and/or a number of lane changes in a traffic situation and/or a speed of the road users and/or transport vehicle.

In addition, setting values can be specified, which are used in particular for monitoring the selected parameters. Such setting values or also called observers can check whether parameters exceed a threshold value, whether parameters lie within a defined value range for a period of time, or also whether combinations of parameters lead to a defined state. Such setting values must also be specified. Reusing these specification parts for further future tests can significantly increase efficiency during testing.

In this regard, a specification of a test, a scenario of a simulation, or a combination of tests can be stored and versioned as a whole or only parts of the specification, therefore, specification parts. All specifications and/or specification parts are provided with meta-information. The contents of the specification are indicated by the metadata/meta-information, so that a user and/or a system can find specification parts more easily. According to the invention, this meta-information constitutes elements of an operational design domain. An operational design domain describes an application context of a product and thus defines uniform terms to describe it. In this regard, a specification part can be assigned one and/or more meta-information.

New specification parts created during the specification of a test and/or simulation are saved, versioned, and stored in a library. This can be located locally on a computer, in a server environment such as, for example, a data center, or in a cloud environment.

The specification itself can be carried out by a user in a graphical user interface. According to the invention, a text editor can be used as a further input. Different levels of user knowledge can also be taken into account by this and the efficiency can be increased overall. The incorporation of stored specification parts in both variants, the graphical user interface or text editor, is possible. A testing and/or simulation tool can also suggest and integrate/incorporate stored specification parts. The retrieval is realized by the specifications of the meta-information. This further accelerates the testing and/or simulation process.

The storage and versioning of the specification parts of a test and/or simulation also enables the exchange to third parties, such as, e.g., other development teams and/or clients. In order to enable a protected exchange, an encryption of the specification parts is to be realized according to the invention. Thus, there will then be a key for encryption and another key for decryption, which is transmitted separately. Both an encrypted and non-encrypted exchange of specification parts is provided, depending on the parties involved and the degree of confidentiality required.

According to an additional aspect of the invention, further a computer program is provided with a program code to carry out the method of the invention when the computer program is executed on a computer. According to an additional aspect of the invention, a data storage medium is provided with a program code of a computer program in order to carry out the method of the invention when the computer program is executed on a computer.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

For a better understanding of the present invention and its advantages, reference is now made to the following description in conjunction with the accompanying drawings. The invention will be explained in more detail hereinbelow with reference to exemplary embodiments which are shown in the schematic illustrations of the drawings.

DETAILED DESCRIPTION

Figure 1:
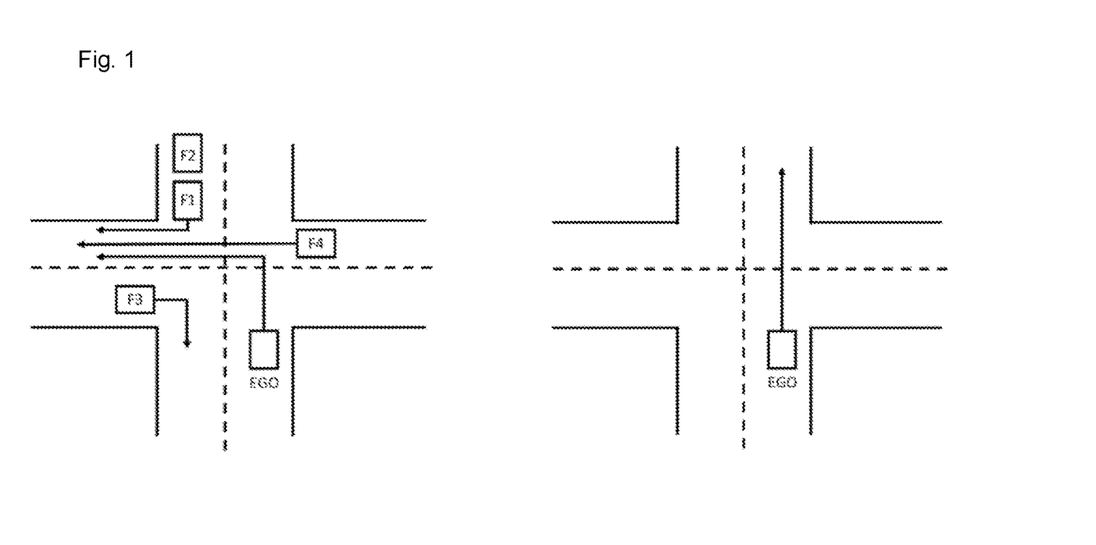
FIG. 1 shows a schematic diagram for differentiating scenarios according to the invention.

FIG. 1 shows a schematic diagram for scenario differentiation of the invention. On the left side of FIG. 1 a scenario is depicted which shows a turning maneuver and has one ego vehicle and four fellow vehicles. On the right side of FIG. 1, the same intersection area is shown but without a turning maneuver with only one ego vehicle.

Different scenarios are shown by FIG. 1 which allow different parameter combinations and also enable different critical test cases. In a scenario-based testing process of a driving assistance system, the identification and specification of critical test cases in particular, for example, a vehicle collision or a near collision, are of importance.

This means that in order to derive a concrete test case, a specification of the scenarios is necessary. Specification parts can be reused here, especially to increase the efficiency of the testing process.

Figure 2:
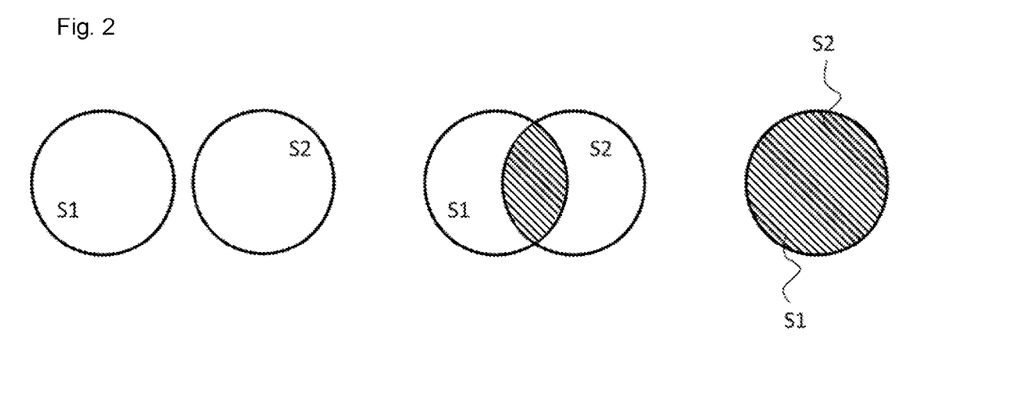
FIG. 2 shows another schematic diagram for differentiating scenarios according to the invention.

FIG. 2 shows a further schematic diagram for the differentiation of scenarios according to the invention (S1 and S2). According to FIG. 2, the scenarios can be completely different with respect to parameter values and/or setting values, have overlapping parameter values and/or setting values, or be the same with respect to the subset of their respective parameter values and/or setting values. Specification parts can be reused here as well. These specification parts must be specifically stored and versioned for this purpose.

Figure 3:
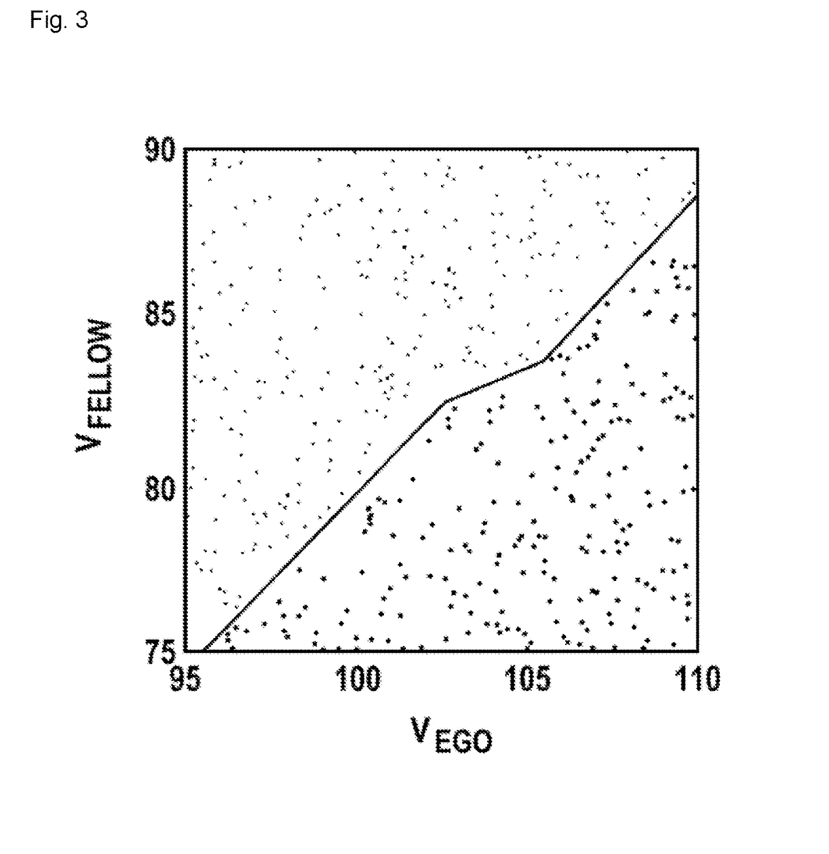
FIG. 3 shows a schematic view indicating a boundary between critical and noncritical test results.

FIG. 3 shows by way of an example the cut-in scenario using the driving situation parameters VEGO, i.e., a speed of the ego vehicle, and on the vertical axis VFELLOW, i.e., the speed of the fellow vehicle in front.

The function shown in FIG. 3 forms the boundary between critical and noncritical test results. The points shown are approximated test results. Alternatively, the points shown can be simulated test results, for example. For this purpose, corresponding parameter values and/or setting values had to be specified so that these test results are obtained.

The evaluation function shown is the safety objective function, which has a numerical value that has a minimum value when a safety distance between the motor vehicle and the further motor vehicle is≥VFELLOW×0.55, has a maximum value when there is a collision between the motor vehicle and the further motor vehicle, and has a numerical value that is greater than the minimum value when the safety distance between the motor vehicle and the other motor vehicle is≤VFELLOW×0.55. In particular, such monitoring setting variables must be specified in advance, but can be expediently reused for further tests. For this purpose, appropriate specification parts must be stored and versioned so that reuse is possible.

As an alternative to the safety objective function, a comfort objective function or an efficiency objective function can be approximated, for example, which has a numerical value that has a minimum value in the case of no change in the acceleration of the motor vehicle, has a maximum value when there is a collision between the motor vehicle and the further motor vehicle, and has a numerical value between the minimum value and the maximum value when there is a change in the acceleration of the motor vehicle as a function of the amount of the change in the acceleration.

A large number of parameter values often have to be defined for the specification of such test scenarios. In addition, setting values must be found that allow monitoring and thus subsequent analysis of the testing process. Such setting values must also be determined and defined as part of the specification. In the example given, in addition to the scenario-determining parameter values, such as speeds of the ego and fellow vehicles, e.g., the time-to-collision, therefore, the time remaining until the collision as a monitoring variable, can be defined as a setting value.

Figure 4:
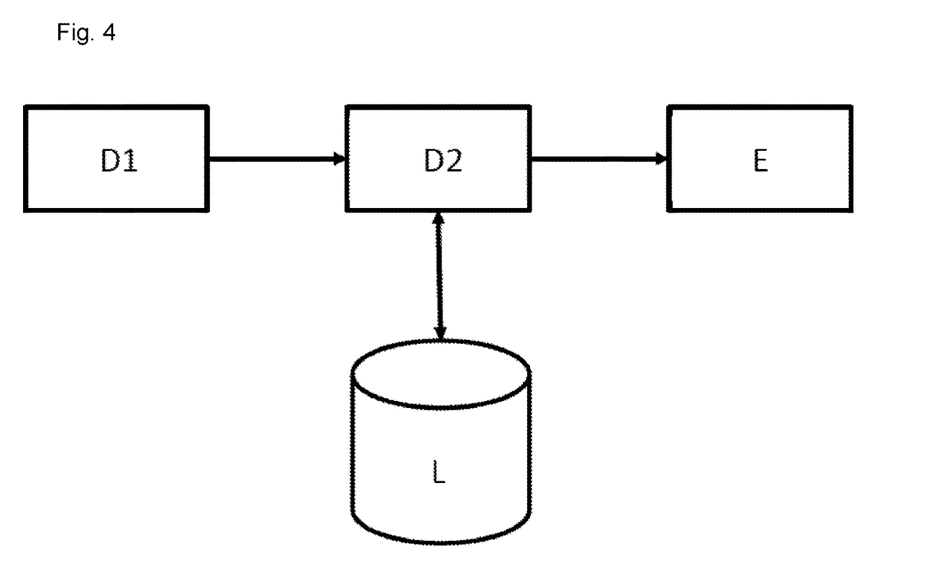
FIG. 4 shows a sequence of the invention for the use of stored specification parts.

FIG. 4 shows a sequence of the invention for the use of stored specification parts. For this purpose, as a first step (D1), at least one scenario to be specified, test, and/or simulation are provided at first. These scenarios, tests, and/or simulations are determined by at least one parameter value or setting value. In this case, parameter values describe the framework conditions to be tested, such as, for example, the speeds of the vehicles involved, lane widths, or road courses. Monitoring variables are defined with the setting values so that the test or simulation can be sufficiently monitored and analyzed.

The specification of the at least one scenario, test, and/or simulation is carried out as a second step (D2). For this purpose, parameter values or setting values are described concretely and assigned actual quantities. For this purpose, stored specification parts can be accessed from a library (L). These specification parts can be integrated into the overall specification. This saves considerable resources that would otherwise be used to repeatedly determine parameter values or setting values. Some variables are to be used in multiple tests or to monitor corresponding variables. This also applies to different tests, scenarios, or simulations. Therefore, reuse is desirable. For this purpose, the specific storage including versioning and the use of stored specification parts is useful. The selection of stored specification parts can be done manually by a user or automatically by a testing and/or simulation tool. If new specification parts not yet stored arise during the specification (D2), these specification parts can be added to the library (L) and stored.

Finished specified tests, scenarios, or simulations can then be executed via the testing and/or simulation tool (E).

Figure 5:
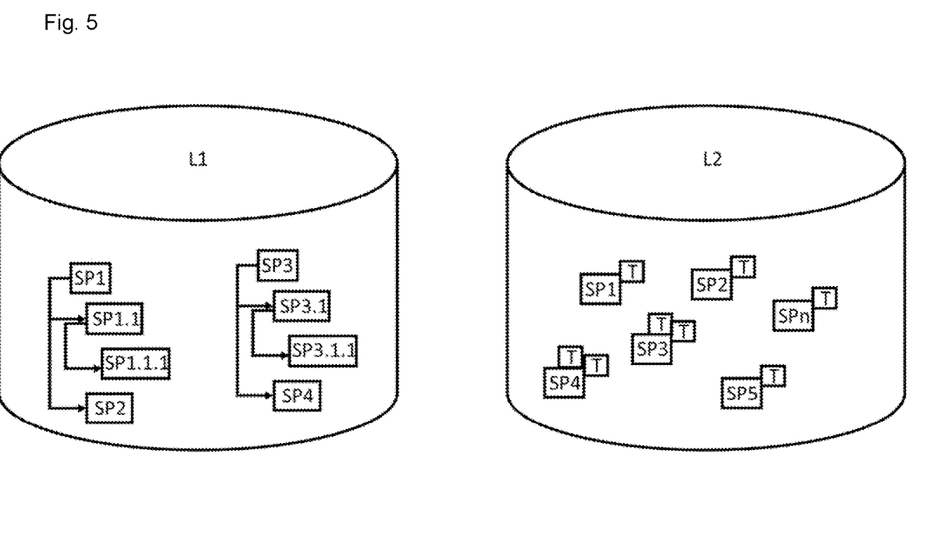
FIG. 5 shows two schematic views of a library for managing stored specification parts.

FIG. 5 shows two schematic views of a library (L1 and L2) for managing stored specification parts. Corresponding libraries (L) can be structured differently. The library (L1) shown on the left of the figure displays specification parts (SP) managed in a tree structure. Moreover, this makes it easy to navigate to corresponding specification parts (SP) and a quick overview of existing specifications can be ensured.

On the right side of the figure, a library (L2) is shown, which is to be understood more as a pool. Specification parts (SP) are stored collected together here. For better findability, specification parts (SP) are assigned meta-information (T) or also tags. Moreover, specification parts (SP) can be searched for in a targeted manner. Such a search can be performed by a user/operator but also by a testing and/or simulation tool, so that automatic offering of specification parts (SP) that may be required is also possible.

Further embodiments or combinations of embodiments with respect to the design of the library (L) are conceivable and are included according to the invention.

Figure 6:
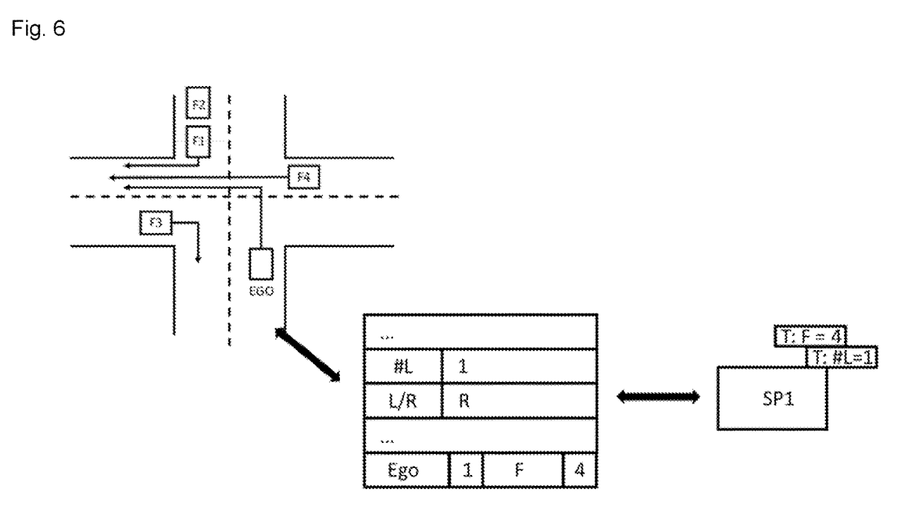
FIG. 6 shows a schematic view of the use of metadata in the method of the invention.

FIG. 6 shows a schematic view of the use of metadata/meta-information (T) in the method of the invention.

Meta-information can be selected as free text or offer already defined terms. For this purpose, the use of elements of an operational design domain is proposed according to the invention.

An operational design domain (ODD) for an at least partially autonomous vehicle is defined by SAE J3016 (2021) as: "Operating conditions under which a given driving automation system, or feature thereof, is specifically designed to function, including, but not limited to, environmental, geographical, and time-of-day restrictions, and/or the requisite presence or absence of certain traffic or roadway characteristics."

Thus, the ODD describes the limits within which the at least partially autonomous vehicle is to be operated and, as such, operates only when the parameters described in the ODD are met. Such an ODD is designed for at least partially autonomous vehicles and can serve as a basis for defining meta-information (T) for the method of the invention.

One of the scenarios from FIG. 1 is shown on the left side in FIG. 6. For this purpose, a possible excerpt from the ODD is shown. Here, for example, the number of lanes on each side (#L), information about left or right traffic (L/R), as well as the number of fellow vehicles (F) can be included in the scenario. Thus, a specification part (SP) can be assigned no meta-information (T) but also likewise a multitude of meta-information (T). The better information about a specification is stored here, the easier it is to find it manually and/or automatically and to integrate it into a new specification.

Further embodiments are possible and are covered according to the invention.

Figure 7:
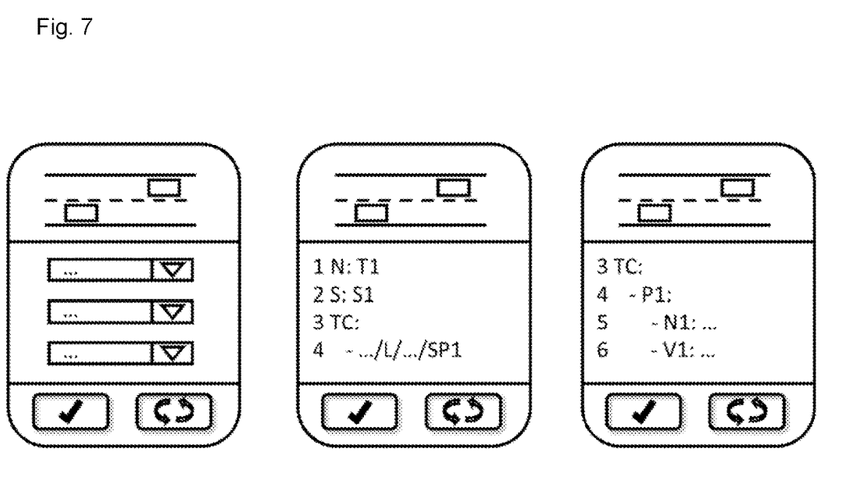
FIG. 7 shows schematic views of user interfaces on the device of the invention, as well as the application of the method.

FIG. 7 shows schematic views of user interfaces on the device of the invention, as well as the application of the method. In this regard, various embodiments of a user interface are covered according to the invention.

A graphical user interface is possible as shown in FIG. 7 on the left, where a user can specify in a guided manner parameter values for a test, scenario, and/or simulation. Here, a user can also manually search for stored specification parts (SP) or automatically receives specification parts (SP) suggested by the testing and/or simulation tool.

A text-based editor can be seen in the middle view in FIG. 7. This can also be used to specify tests, scenarios, or simulations. Specifications or specification parts that have already been saved can again be searched for manually or displayed automatically and integrated into the specification using common commands. It should also be possible to select and save specifically specification parts and to version them.

As shown in the right view in FIG. 7, a new text-based specification is also possible without recourse to already existing specification parts.

In addition, further embodiments are possible and are intended to be covered by the method and device of the invention.

Figure 8:
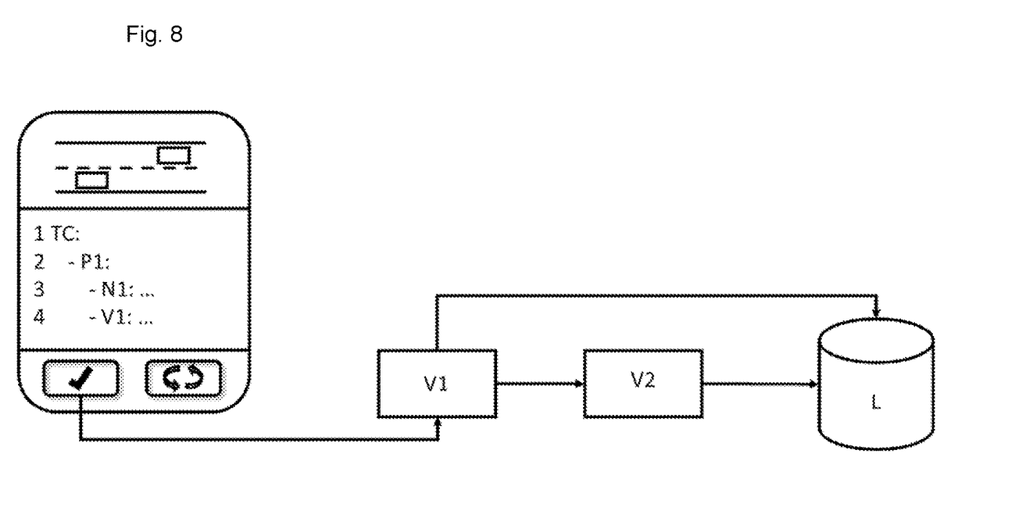
FIG. 8 shows a sequence for the use of encryption in the method of the invention.

FIG. 8 shows a sequence for using encryption in the method of the invention.

If, in the course of the specification, a new specification part that has not yet been saved should arise, this can be saved and versioned, on the one hand, and also encrypted, on the other. Encryption allows the specification parts to be passed on to third parties without releasing the source code or realizes a secure transfer to the third party.

First, it is decided that the corresponding specification part is to be saved. Then meta-information can be added to the corresponding specification part (V1), as already described. Subsequently, it is determined whether the specification part is fed directly into the library (L) or whether an encryption (V2) is initiated first. Known encryption methods can be used for this purpose. An encrypted specification part can only be integrated into another specification if the required key to release the specification part is known. Rights to the specification can be preserved in this way or new business models can also be established.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for stored specification parts of at least one test and/or at least one simulation, the method comprising:
   providing the at least one test to be specified and/or the at least one simulation for testing driving functions of a vehicle and the at least one test and/or the at least one simulation are determined by at least one parameter value and/or setting value; and
   performing a specification of the at least one test and/or the at least one simulation, the specification including at least one specification part,
   selecting parameter values and/or setting values; and
   assigning concrete parameter values and/or setting values by the specification for the at least one test and/or the at least one simulation, the parameter values and/or setting values are selected manually or automatically,
   wherein already stored specification parts are selected manually and/or automatically and integrated into the specification, and
   wherein the at least one specification part is provided with meta-information indicating a relationship between the at least one specification part and an element of an operational design domain.

2. The computer-implemented method according to claim 1, wherein the method further comprises at least one test of a device for anthe at least partially autonomous guidance of a transport vehicle, wherein the transport vehicle comprises at least one ego vehicle and/or fellow vehicles, and wherein the ego vehicle is a vehicle with a system under test and a fellow vehicle is any other vehicle.

3. The computer-implemented method according to claim 1, wherein the parameter values comprise:

scenery parameters comprising at least one of the features: a number of and/or a width of a lane and/or curves and/or road restrictions and/or an ambient temperature; and/or driving situation parameters describing the number and properties of moving objects in a scenario, comprising at least one of the features: a number of road users and/or a number of lane changes in a traffic situation and/or a speed of the road users and/or transport vehicle.

4. The computer-implemented method according to claim 1, wherein the setting values comprises setting values for monitoring at least one selected parameter and/or parameter value during the test execution/simulation.

5. The computer-implemented method according to claim 1, wherein each specification part is stored separately.

6. The computer-implemented method according to claim 5, wherein the stored specification parts are found by their meta-information manually by a user of a testing and/or simulation tool and/or automatically by a testing and/or simulation tool itself.

7. The computer-implemented method according to claim 1, wherein a newly created specification part is stored and the stored specification part is stored and versioned locally and/or in a server environment and/or in a cloud environment, and wherein the stored specification part is managed in a library.

8. The computer-implemented method according to claim 1, wherein the execution of the specification by stored specification parts can be done by an input in a text editor and/or by input in a graphical user interface of a testing and/or simulation tool.

9. The computer-implemented method according to claim 1, wherein encryption of the specification parts enables an exchange of these specification parts and prevents disclosure of contents of the specification parts between the parties and/or to third parties.

10. A non-transitory computer-readable data storage medium containing program code of a computer program in order to carry out the method according to claim 1, when the computer program is executed on a computer.

11. The computer-implemented method according to claim 1, wherein a release of an integration of existing specification parts takes place by entering and/or transferring a key.

12. The computer-implemented method according to claim 11, wherein one party uses a key for encryption and another and/or the same party uses another key for decryption.

13. The computer-implemented method according to claim 1, wherein an element of an operational design domain provides one or more elements of a scenario under test.

14. The computer-implemented method according to claim 1, wherein the meta-information is selected as free text.

15. A computer-implemented method for stored specification parts of at least one test and/or at least one simulation, the method comprising:

providing the at least one test to be specified and/or the at least one simulation for testing driving functions of a vehicle and the at least one test and/or the at least one simulation are determined by at least one parameter value and/or setting value; and performing a specification of the at least one test and/or the at least one simulation, the specification including at least one specification part, selecting parameter values and/or setting values; and assigning concrete parameter values and/or setting values by the specification for the at least one test and/or the at least one simulation, the parameter values and/or setting values are selected manually or automatically, wherein already stored specification parts are selected manually and/or automatically and integrated into the specification, wherein the specification of the at least one test and/or the at least one simulation has at least one specification part and each specification part is stored separately and provided with meta-information, wherein the meta-information indicates a relationship between a specification part and an element of an operational design domain, and wherein an element of an operational design domain provides one or more elements of a scenario under test, and the operational design domain thus comprises predefined elements that are used as meta-information for specification parts.

16. A computer-implemented method for stored specification parts of at least one test and/or at least one simulation, the method comprising:

providing the at least one test to be specified and/or the at least one simulation for testing driving functions of a vehicle and the at least one test and/or the at least one simulation are determined by at least one parameter value and/or setting value; and performing a specification of the at least one test and/or the at least one simulation, the specification including at least one specification part, selecting parameter values and/or setting values; and assigning concrete parameter values and/or setting values by the specification for the at least one test and/or the at least one simulation, the parameter values and/or setting values are selected manually or automatically, wherein already stored specification parts are selected manually and/or automatically and integrated into the specification, and wherein a release of an integration of existing specification parts takes place by entering and/or transferring a key, wherein one party uses a key for encryption and another and/or the same party uses another key for decryption, and wherein the key for decryption is transmitted separately.

17. A system, comprising:

a memory including a library storing stored specification parts; and a processor including a testing and/or simulation tool set up for the stored specification parts of at least one test and/or at least one simulation, the tool configured to:

provide the at least one test to be specified and/or the at least one simulation for testing driving functions of a vehicle and the at least one test and/or the at least one simulation are determined by at least one parameter value and/or setting value; and perform a specification of the at least one test and/or the at least one simulation, wherein the specification comprises at least one specification part, wherein the parameter values and/or the setting values are selected and concrete parameter values and/or setting values are assigned by the specification for the at least one test and/or the at least one simulation, wherein the parameter values and/or setting values are selected manually or automatically, wherein the stored specification parts are selected manually and/or automatically and integrated into the specification, and wherein the at least one specification part is provided with meta-information indicating a relationship between the at least one specification part and an element of an operational design domain.

18. The testing and/or simulation tool according to claim 17, wherein a testing unit is formed by a control unit for which at least one simulation and/or at least one virtual and/or real test is defined.

* * * * *